United States Patent [19]
Hills

[11] 3,857,142
[45] Dec. 31, 1974

[54] SNAP HOOK

[76] Inventor: Marvin S. Hills, 125 Springfield Rd., Elizabeth, N.J. 07208

[22] Filed: Aug. 27, 1973

[21] Appl. No.: 391,913

[52] U.S. Cl. .................................. 24/237, 72/324
[51] Int. Cl. ...................... A44b 13/02, B21f 13/00
[58] Field of Search ........ 24/3 K, 236, 237; 70/456, 70/458, 459; 150/40; 72/324; 43/43.2, 43.6, 44.83; 140/80; 29/7, 9

[56] References Cited
UNITED STATES PATENTS

| | | | |
|---|---|---|---|
| 345,407 | 7/1886 | Besse | 70/458 |
| 719,704 | 2/1903 | Trakel | 43/43.6 |
| 1,110,873 | 9/1914 | Boye | 70/458 |
| 1,208,936 | 12/1916 | England | 43/43.6 |
| 1,524,210 | 1/1925 | Prentice | 150/40 |
| 1,648,016 | 11/1927 | Freysinger | 24/237 |
| 2,459,735 | 1/1949 | McKinnon | 24/236 X |
| 2,677,954 | 5/1954 | Howell et al. | 70/456 B |
| 3,210,883 | 10/1965 | Ulsh | 43/44.83 X |
| 3,564,881 | 2/1971 | Burniski | 70/456 B |

Primary Examiner—Donald A. Griffin
Attorney, Agent, or Firm—Omri M. Behr; Peter J. Gaylor

[57] ABSTRACT

There is provided a novel snap hook of the type commonly known as lanyard hooks, having a suspending means readily adaptable for use in key cases, integral therewith.

7 Claims, 8 Drawing Figures

PATENTED DEC 31 1974　　3,857,142
FIG. 1
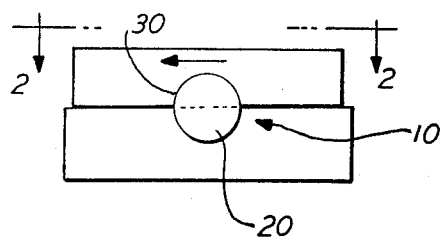
FIG. 2
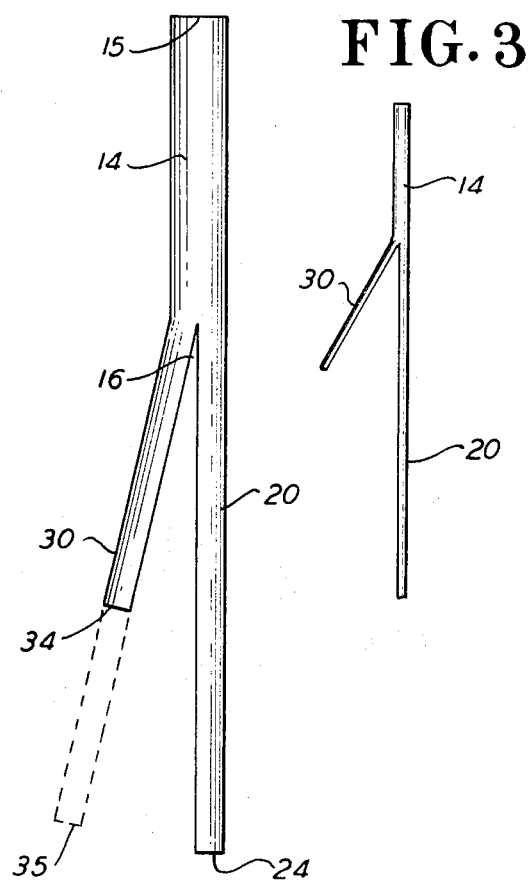
FIG. 3
FIG. 4
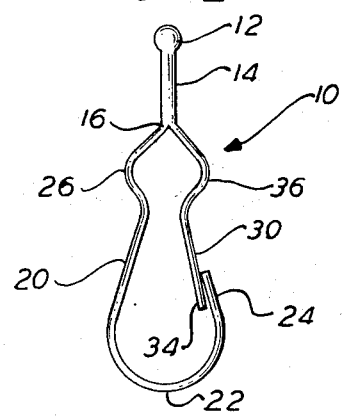
FIG. 5
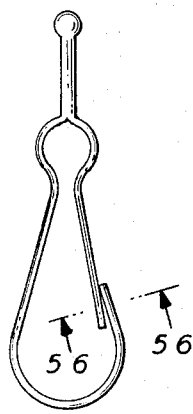
FIG. 6
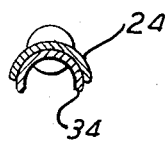
FIG. 7
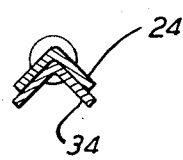
FIG. 8
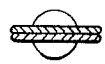

SNAP HOOK

FIELD OF THE INVENTION

Snap Hooks

DESCRIPTION OF THE PRIOR ART

Many types of hooks for use in key cases are known, as are different methods for suspending such hooks. It has been found that hooks of the lanyard type are particularly favored by ladies for this purpose since the keys may be readily inserted in and taken out of such hooks without the danger of breaking or cracking long finger nails. The characteristic of the lanyard hook is maintained closed by the outward pressure of one portion of the hook upon the other. This is in contrast to many less expensive types of hooks which are undesirable for the reason stated above which are kept closed by inward pressure of one member upon the other. The conventional lap type of lanyard hook is illustrated in Freysinger U.S. Pat. No. 1,648,016 and another somewhat less conventional type of lanyard hook is illustrated in Morehouse U.S. Pat. No. 2,019,691.

One of the principal production problems associated with hooks of the lanyard type has been a method of suspending such a hook, particularly where it is desired to use it in the key carrying case.

Of necessity the lanyard hook in all its variations known heretofore, is a substantially flat strip of metal bent around upon itself. Heretofore, there has been no way to provide it with an integral suspending arm. The suspending means, heretofore, had to be separate as illustrated by the Freysinger and Morehouse hooks referred to above. It is desirable that the suspending means utilized should make available as many degrees of rotary freedom as possible. In hooks of the lanyard type it has been found convenient to impact one end of the hook into a head of diameter greater than the wire utilized for the hook itself. Such a hook suspending means are illustrated in Zarowin U.S. Pat. No. 2,232,503, Rice U.S. Pat. No. 2,548,820 and Robinson U.S. Pat. No. 2,972,880. As will be clear from an inspection of these devices, this solution has heretofore not been available for use with lanyard hooks since the lanyard hoods produced heretofore do not have an available end for impacting.

SUMMARY OF THE INVENTION

There is provided a novel hook of the lanyard type in integral combination with a suspending means in the form of an enlarged head. The lanyard hooks of the present invention are manufactured from a single piece of wire, preferably round wire, which is partially sheared to provide a shank portion, and two arm segments. The arm segments are crimped near their juncture with the shaft segment to provide resilience, one segment is cut shorter than the other, the two arm segments brought into a common plane perpendicular to the shear plane, and the longer end bent transversely upon itself to cover the shorter segment while being in divergent relation therewith at the point of juncture with the shank portion.

The end of the shank portion is impacted by means known in the art to provide a head portion from which the device may be suspended in a key case of the conventional type. It should be noted that it is not critical to the mode of manufacture of the device at which stage of manufacture the shank portion is impacted to provide a head portion.

DESCRIPTION OF THE DRAWINGS

FIG. 1 shows an end elevational view of the raw wire in a shearing block prior to shearing.

FIG. 2 shows a plan view of the wire of FIG. 1 viewed at 2—2 after the shearing step.

FIG. 3 shows a side elevational view of the strip of FIG. 2 after the arm segments have been brought into a common plane perpendicular to the common shear plane.

FIG. 4 is a side elevational view of the hook of the present invention showing optional bends as dotted lines.

FIG. 5 is a side-elevational view of the hook of the present invention similar to that of FIG. 4 showing viewed lines 56—56.

FIGS. 6, 7 and 8 are alternate cross sectional views of the opening in the hook as viewed at 56—56.

DESCRIPTION OF THE PREFERRED EMBODIMENTS

The device of the present invention 10, comprises in essence two parts — a hook portion and a suspending means. It has been found possible by the procedures of the present invention described in detail herein below to provide a spring hook of the lanyard type made from a single piece of rod or wire.

The unitary suspendable snap hook 10 of the present invention comprises a head portion 12, attached to one end of shank portion 14, wherein the maximum thickness of said head member measured perpendicularly to the principal axis of the shank portion exceeds the thickness of said shank portion measured perpendicular to the axis of said shank member. The other end of said shank member is split into a shorter portion 30 and a longer portion 20, which together comprise the actual hooking portion of the device. Segments 20 and 30 lie in a common plane with shank member 14 said plane being perpendicular to the shear plane between segments 30 and 40 which will be discussed hereinbelow.

Said segments are in divergent relation to each other at end 16 of shank portion 14. Proximate to point 16, portion 20 is bent in a concave loop 26 similarly shorter portion 30 is bent in a concave loop 36. The hollow portion of said loops facing inwardly towards each other and towards the principal axis of the shank member, which lies in the shear plane referred to hereinbelow.

While it is preferred to have bends at 26 and 36, the device is operative without one bend or either bend. In the modification wherein the bends at 26 and 36 are absent longer portion 20 does not have the same flexibility as when bends are present unless a more resilient high carbon steel then is usually employed is used.

End portion 22 of longer segment 20 is bent in the form of a loop so that end 24 of segment 20 slightly overlaps end 34 of shorter segment 30.

In operating the device the key is inserted between ends 34 and 24 by pressing short end 30 rearwardly towards end 20. Reflexibility of Sector 30 being provided by the concave bend at 36.

As stated heretofore, the advantages of the present invention lie in the manufacture of the device from a single piece of thick wire or thin rod. In the procedure of manufacture, a portion of rod, preferrably of round cross section is sheared to provide the substantially y-shaped strip illustrated in FIG. 2. The shearing is carried out in such a manner that the legs 30 and 20 are of substantially equal cross section having flat surfaces lying on a common shear plane, and joined to the remaining portion 14 at point 16. The bends may then be placed at 36 in Segment 30, and, if desired, at 26 in Segment 20 by bending means well known in the art. The portion of 30 lying between 34 and 35 is then removed. It should be noted that it is unimportant from the point of view of the process of the present invention, whether the segment of 30 between 34 and 35 is removed before or after the bending step. Segment 30 is then moved upwardly in relation to the flat shear surface of Segment 20 and back into a common plane therewith, said plane being perpendicular to the shear plane.

The lower end 22 of Segment 20 is then bent to lie over end 34 of Segment 30.

At any suitable stage of the procedure end 15 of Segment 14 is swaged into a head segment of greater thickness than shank portion 14 by methods well known in the art.

If desired, the outer, that is to say, rounded portion of Segment 30 at end 34 and similarly, if desired, the outer, that is to say, rounded portion of end 24 are flattened to provide a tight closure of esthetic appearance, or flattened and shaped to form rounded or vee-shaped ends which lend a detent effect aiding their alignment as shown in FIGS. 5 and 6.

I claim:

1. A unitary suspendable one piece snap hook comprising
    a head portion,
    a shank portion,
    the head portion being affixed to one end of said shank portion wherein the maximum thickness of said head member measured perpendicular to the principal axis of said shank portion exceeds the thickness of said shank portion measured perpendicular to the axis of said shank portion,
    said head portion being anchorable in a suitable external retaining means
    a body portion unitary with said shank portion comprising
    a shorter segment and a longer segment extending from the other end of said shank portion in divergent relation to each other,
    said shorter body segment and said longer body segment lying in substantially a common plane with said shank portion, the end of said longer segment distant from the shank portion being bent upon itself to over-lie the end of said shorter segment at its end distant from the shank to form a loop.

2. A snap hook in accordance with claim 1 wherein a first concave bend is provided in the shorter body segment proximate to said shank portion, the hollow face of said bend facing inwardly towards the principal axis of the shank portion.

3. A snap hook in accordance with claim 2 additionally comprising a second concave bend in the longer body segment proximate to said shank portion, the hallow face of said bend facing inwardly towards said principal axis of the shank portion and towards the similar first bend in the longer body segment.

4. A snap hook in accordance with claim 1 wherein the cross section of the material forming the longer and shorter body segments is substantially semi-circular having the flat portion thereof facing the interior of the hook.

5. A snap hook in accordance with claim 4 wherein the end of the shorter segment and the end of the longer segment of the body portion at the point where said longer segment end overlies said shorter segment end are both substantially flat.

6. A snap hook in accordance with claim 4 wherein the end of the shorter segment and the end of the longer segment of the body portion are substantially V-shaped, the arms of the V being of substantially equivalent cross section and the apex of the V pointing outwardly whereby the apex of the V of the longer segment overlies the apex of the V of the shorter segment.

7. Method of making a unitary suspendable snap hook from a single piece of wire comprising the steps of:
    i. shearing a segment of wire substantially across a diameter thereof to provide
        a. a shank portion of full original cross section,
        b. an arm segment having one end thereof attached to said shank portion and subtending an angle of less than 90° thereto having a substantially semi-circular cross section,
        c. a base segment in substantially linear relation to said shank portion,
    ii. bending said arm segment and said base segment proximate to said shank portion to provide a concave bend therein the hollow face of said bend facing inwardly to the common shear plane of said segments,
    iii. bending said arm segment and said base segment to orient said segments in divergent relation in a common plane,
    iv. cutting one of said segments to provide one segment longer than the other and bending the longer of segments transversely upon itself to overlie the end of said shorter segment to provide a substantially closed loop,
    and compressing the remaing end of said shank portion to provide a head portion having a maximum diameter relative to the principal axis of the shank portion greater than the diameter of said shank portion relative to its said principal axis.

* * * * *